UNITED STATES PATENT OFFICE.

PETER BAUMGRAS, OF SYRACUSE, NEW YORK, ASSIGNOR TO HIMSELF AND CHARLES E. LIVINGSTON, OF UNITED STATES ARMY.

IMPROVEMENT IN OBTAINING USEFUL PRODUCTS FROM THE BERRIES OF THE GREEN-BRIER.

Specification forming part of Letters Patent No. 42,814, dated May 17, 1864.

*To all whom it may concern:*

Be it known that I, PETER BAUMGRAS, of Syracuse, in the county of Onondaga, in the State of New York, have discovered a species of coffee and a caoutchouc-like substance in the berries of the plant known as "green-brier" or "cat - brier," with the botanical name of *Smilax glauca* and *Rotundifolia*, of the order *Smilacea*, (Gray,) of which the following is a specification.

In order that all may understand the nature of my discovery, I desire to explain as follows:

The fruit of the plant herein mentioned is a hardy berry which frequently remains upon the plant during the greater part of the winter. The berries generally grow in clusters, and are very abundantly distributed over the vine. Each berry contains from one to five seeds, (averaging three.) Each of the seeds is inclosed in a bag or sack of transparent elastic gum, very similar to caoutchouc or india-rubber. The pulp may be removed from about the seeds by washing or by any ordinary process, such as rubbing between rough surfaces, &c. This leaves the seeds still inclosed in the caoutchouc-like bags. These bags may now be removed by more violently agitating them between rough surfaces than in the removal of the pulp; or this may be omitted, as the bags can be recovered after the berries have been roasted and ground. After separating the seeds and bags, the seeds may be roasted and ground, like coffee, and by the ordinary modes an excellent beverage obtained, wonderfully resembling coffee in all respects. The seeds contain much oil, resembling in this respect cocoa or chocolate. During the roasting process the seeds give out an exceedingly strong coffee smell. This is also a characteristic of the material when ground.

The sacks or bags may be dissolved readily in either chloroform or any of the essential oils which dissolve the caoutchouc, and upon evaporation the caoutchouc-like substance is produced, possessing the qualities of pure gum-caoutchouc, and it is my opinion that it possesses certain additional properties which will render it exceedingly valuable for certain applications.

It is further my opinion that the plant above mentioned grows in great abundance throughout the United States, and that by cultivation the seeds could be greatly increased in size.

I therefore claim—

1. Utilizing the seeds of the *Smilax glauca* and *Rotundifolia*, in the manner and for the purpose hereinbefore described.

2. Utilizing the sack which surrounds each seed of the berry of the *Smilax glauca* and *Rotundifolia*, in the manner and for the purpose hereinbefore described.

PETER BAUMGRAS.

Witnesses:
T. G. CLAYTON,
R. M. BEALE.